Jan. 12, 1954  W. K. LEWIS ET AL  2,665,971
PRODUCTION OF PURE CARBON DIOXIDE
Filed May 12, 1949  2 Sheets-Sheet 1

Warren K. Lewis
Edwin R. Gilliland   Inventors

By Henry Berk  Attorney

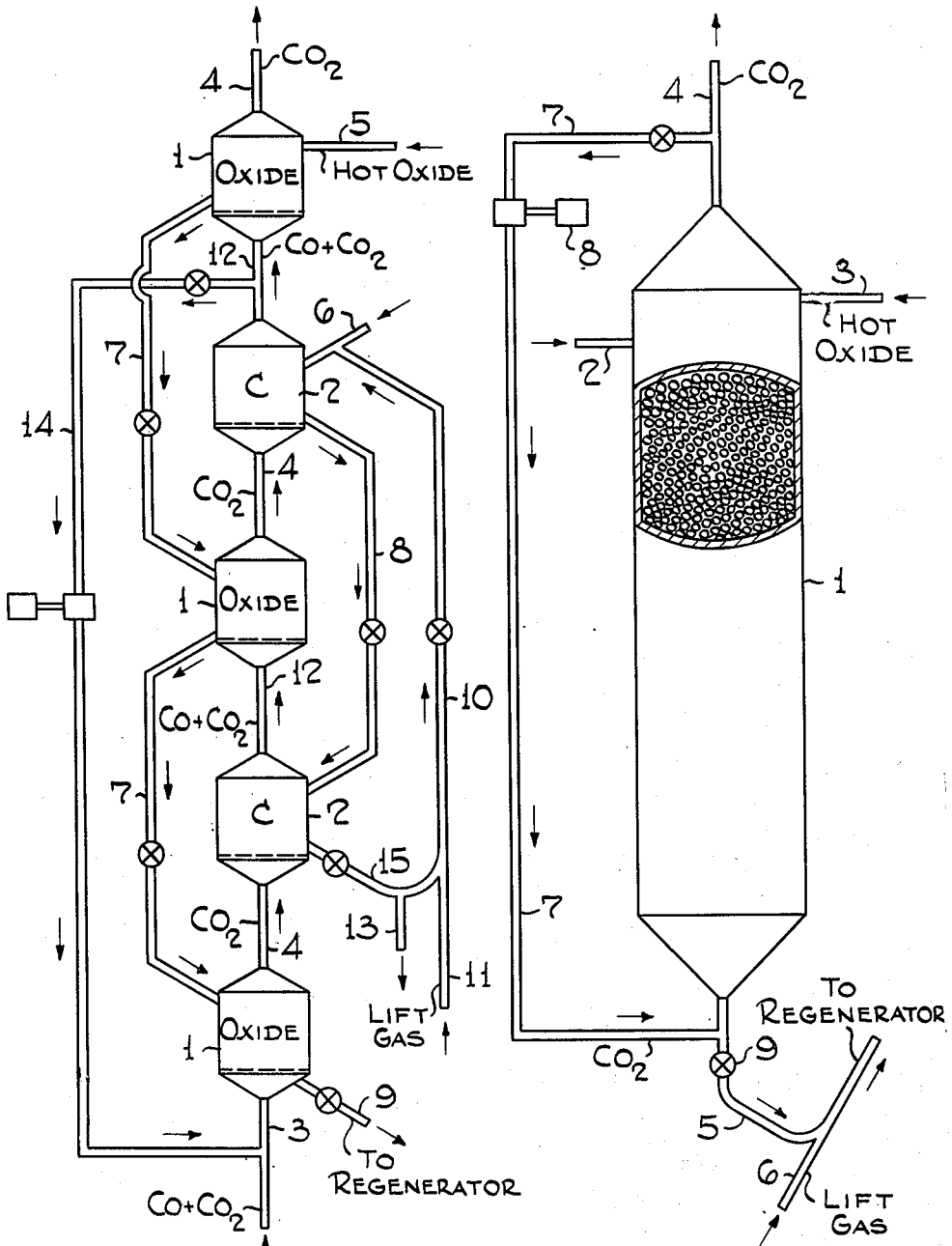

Patented Jan. 12, 1954

2,665,971

UNITED STATES PATENT OFFICE 2,665,971

PRODUCTION OF PURE CARBON DIOXIDE

Warren K. Lewis, Newton, and Edwin R. Gilliland, Arlington, Mass., assignors to Standard Oil Development Company, a corporation of Delaware Application May 12, 1949, Serial No. 92,812

6 Claims. (Cl. 23—150)

This invention relates to the production of pure carbon dioxide from oxidizable carbonaceous material, and particularly to the production of carbon dioxide free of inert gases, such as nitrogen. More particularly, the invention is concerned with the oxidation of carbonaceous material by means of solid oxidizing agents, such as metallic oxides as the source of oxygen.

At present there are two industrial sources of carbon dioxide, namely, as by-product from alcohol fermentation and as recovery from flue gases. The carbon dioxide produced in the former process is pure and cheap but limited in amount. The latter source requires absorption of the $CO_2$ in carbonate solutions followed by boiling to release the pure gas. This operation is perfectly workable but cumbersome and consumes very large quantities of heat. The amount of heat required for recovery of $CO_2$ from flue gas is so large that it is not uncommon to burn extra fuel over and above that necessary to make the $CO_2$. A cheap source of $CO_2$ is, therefore, highly desirable.

In the production of flue gas, the oxidizing agent generally employed is air. The use of air introduces into the product gas large amounts of inert gases, such as nitrogen, which complicate the concentration of $CO_2$ by condensation or absorption.

It is, therefore, the principal object of this invention to provide an improved process for producing pure carbon dioxide with the aid of solid oxidizing materials possessing the necessary oxidation potential as the oxygen transfer agent under controlled reaction conditions.

It is a further object of this invention to provide a process for the conversion of oxidizable carbonaceous material, particularly, finely-divided coal and coke to carbon dioxide.

A more specific object of this invention is to provide a process of the type specified which will permit oxidation of the carbonaceous material by metallic oxides, without contaminating the carbon dioxide with inert gases, such as nitrogen.

It is also an object of this invention to produce carbon dioxide under pressure, thus obviating the necessity of compressing the carbon dioxide.

These and other objects of the invention will be apparent from the description to follow.

The source of carbon from which the carbon dioxide is prepared may be any oxidizable carbonaceous material, such as charcoal, coal, coke, heavy distillate oil, residual oils, gaseous hydrocarbons, peat, shale, oil sands, lignite, bitumen, etc. Charcoal and coke are the preferred solid starting materials, particularly coke and charcoal of low ash content. Charcoal fines and coke breeze are particularly suitable. The process utilizes raw material which in other processes suffer particular disadvantages.

The solid oxygen carriers employed in place of air in accordance with this invention are particularly metal oxides which remain solid, which will not sinter at the process temperatures and which may be readily regenerated by oxidation with air below the sintering temperature. The oxide employed must possess a sufficiently high oxidation potential. Suitable metal oxides are ferric oxide, cupric oxide on a clay or suitable carrier, vanadium pentoxide, stannic oxide, etc. It will be noted that all of these oxides have an oxidation potential sufficiently high so that under equilibrium conditions (in temperature range involved) they will convert carbon substantially quantitatively to $CO_2$. Ferric oxide, $Fe_2O_3$, either pure or in the form of ores rich in $Fe_2O_3$, is the preferred oxidizing agent due to its availability and low cost. The metal oxide employed in the process may become contaminated with ash and coke and eventually diluted down to a point where it must be discarded, hence the necessity for a cheap oxide. Furthermore, ferric oxide is extremely practical and presents no problems from an operational standpoint. A low grade iron ore can be employed at the expense of circulating more raw material. However, such a procedure is economical when employed in a fluid system as will be described. It is permissible to circulate about 40 to 50 lbs. of solid oxide for every pound of $CO_2$ taken off as product. When $Fe_2O_3$ is employed it is preferably not reduced substantially below the $Fe_3O_4$ oxide. It is suggested that at most 90% of the $Fe_2O_3$, preferably 50–75% be reduced to $Fe_3O_4$ during the reaction between $Fe_2O_3$ and the carbonaceous material.

The solid oxygen carriers of this invention may be employed in a finely-divided form and contacted with the carbonaceous raw materials either in the form of a fluidized mass or a moving bed. The carbonaceous raw materials when solid are likewise preferably used in a finely-divided state.

The fluidized state of the reactants affords perfect contact between the solids, ideal temperature control and greatest uniformity of reactant distribution throughout the fluidized mass. As a result the process is extremely flexible and may be readily controlled at the desired degree of carbon oxidation. Since the only oxygen available in the reaction zone is bound in the form of a metallic oxide, the product remains free of inert gases, such as nitrogen.

In order to obtain proper fluidization all solid reactants should be ground to a size that substantially all of it will pass through 100-mesh screen. For the best results, the ground solids should include a wide range of particle sizes, ranging upwardly from about 20 microns to about 100-mesh with a large proportion of the material between about 100 and 200-mesh.

Fluidization is accomplished in the carbon dioxide generator by means of carbon dioxide vapors produced in the reaction zone or separately introduced thereto. Small amounts of the $CO_2$ product may be recycled to a lower portion of the reacting solids to assure uniform fluidization over its entire height. Superficial linear flow velocities of the fluidized gases within the fluidized bed may vary between about 0.3 and 4 ft. per second for proper fluidization of most practical solid reactants in the particle sizes mentioned above.

Spent solid oxygen carrier is intermittently or continuously reoxidized with air in a separate reactor and returned to the $CO_2$ generation zone. In accordance with the preferred embodiment of the invention, the spent oxygen carrier consists principally of $Fe_3O_4$ and $Fe_2O_3$. This mixture may be conducted from the $CO_2$ generation zone and contacted in the fluidized state with air in a combustion zone to be reoxidized to $Fe_2O_3$, which is thereafter returned to the $CO_2$ generation zone. Since the reoxidation reaction in the burner is highly exothermic, all or at least a substantial part of the heat required for the carbon oxidation by the iron oxide may be generated in the reoxidation stage and supplied to the carbon dioxide generator in the form of sensible heat of reoxidized iron oxide.

It has been found that carbonaceous materials will react with certain metallic oxides at a high rate at temperatures in the range of 500° C. to 1200° C. For example, $Fe_2O_3$ reacts with retort coke at temperatures between 1000° C. and 1200° C. Reaction between $Fe_2O_3$ and wood charcoal sets in at about 750° C., while methane reacts with CuO supported on silica gel or Alundum at temperatures as low as 600° C. In all instances the upper temperature limit to be employed is governed by the sintering temperature of the oxide. For this reason temperatures above 1200° C. are to be guarded against if not avoided altogether.

The reaction may be carried out in a two-vessel or three-vessel system employing fluidized solids, or the reaction may take place in a moving-bed or soaker-type reactor.

The reoxidation of the spent metallic oxide may be carried out, while avoiding sintering, at temperatures slightly higher than the reaction temperatures, i. e., 1000° C.–1200° C., preferably 1050° C. to 1100° C.

In order to assure high reaction rates and to carry carbon oxidation in the $CO_2$ generator as far as possible, it is preferable to employ a substantial stoichiometrical excess of $Fe_2O_3$ over the oxidizable carbon present. Even if there should be unconverted carbon in the generator, the production of carbon monoxide therefrom will be negligible. Any carbon monoxide formed reacts rapidly with the $Fe_2O_3$ to produce $CO_2$, but the carbon reacts only slowly with the $CO_2$ thus produced at the temperature in the generator. In other words, the carbon will not react rapidly enough with the $CO_2$ produced to form CO.

The nature of the present invention will appear more clearly from the following detailed description of the accompanying drawings in which each figure is a front elevation in diagrammatic form of one type of plant apparatus suitable for the practice thereof.

Figure 2 represents the moving-bed or soaker-type reactor employed with solid carbonaceous materials.

Figure 3 represents a system employing alternate moving beds of solid carbonaceous material and metallic oxide.

Figure 1:
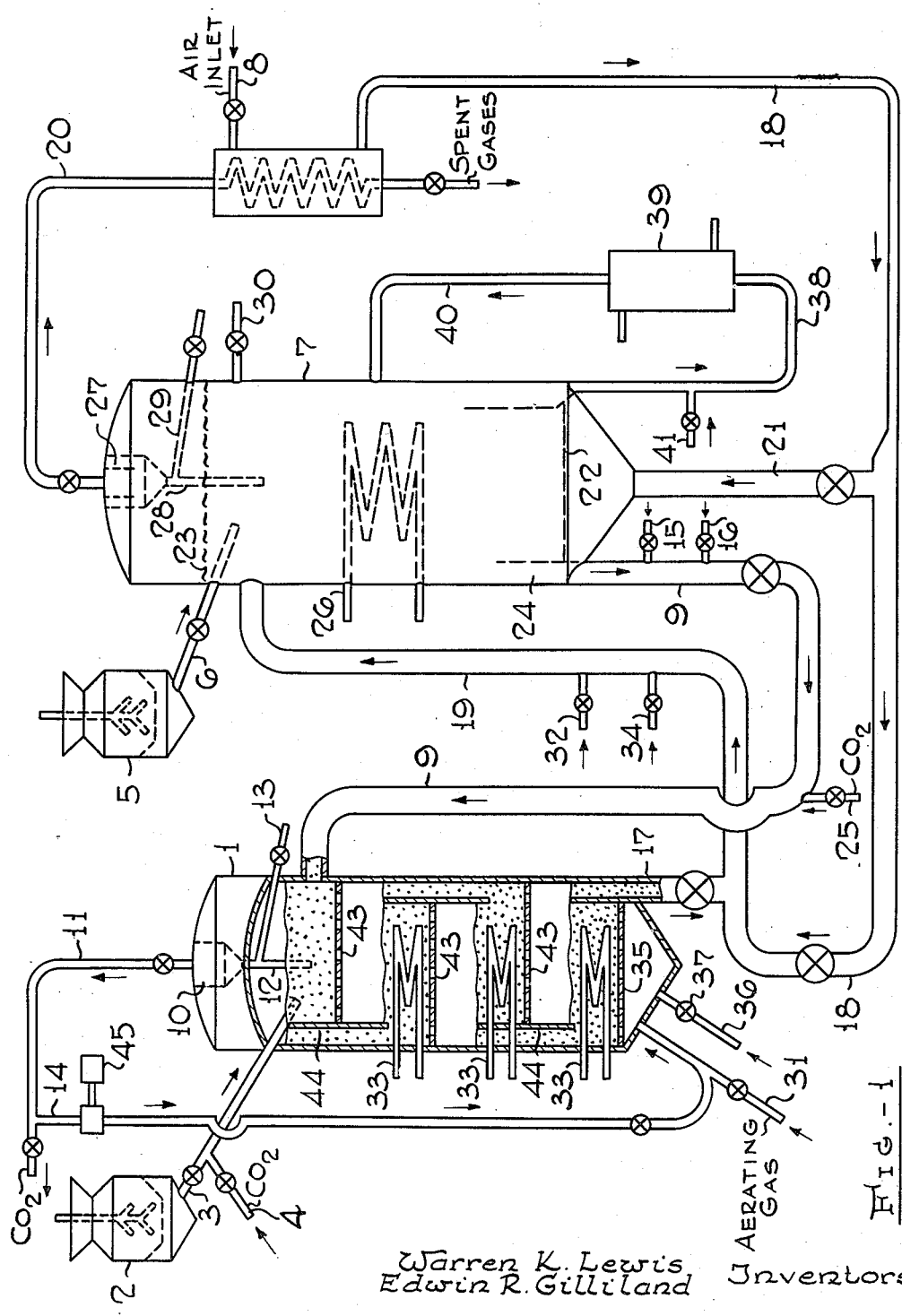
Figure 1 represents a two-vessel system employing fluidized solids. The system is preferably used when employing both solid and gasifiable carbonaceous material.

Referring to Figure 1 numeral 1 represents a carbon dioxide generator into which finely-divided carbonaceous material, such as coke, is led from hopper 2 via line 3. To aid in the flow of the carbonaceous material into vessel 1 a small amount of an aerating gas, such as carbon dioxide, may be added through line 4. Numeral 5 represents a hopper containing finely-divided solid metallic oxide, for example iron oxide. The finely-divided iron oxide enters an upper portion of oxidation zone 7 via line 6. In initiating the process an initial charge of iron oxide may be mixed with carbon and the mixture heated in vessel 7 by means of combustion between the carbon and air entering through line 8 without reduction of the iron oxide. The hot iron oxide collects in withdrawal well 24 and is withdrawn from vessel 7 and passed under the pseudo-hydrostatic pressure in a fluidized condition via line 9 into generator 1, preferably at an upper level. In generator 1 a temperature of 800° C. to 1000° C., preferably 900° C. to 950° C. is maintained, the heat required being supplied substantially by the sensible heat of the hot oxide. At this temperature reaction occurs between the solid carbonaceous material such as coke, supplied through line 3, and $Fe_2O_3$, forming $CO_2$. The $Fe_2O_3$ introduced into vessel 1 may be maintained in stoichiometrical excess over the oxidizable carbon present.

In operating, using finely-divided coke as the carbonaceous material and $Fe_2O_3$ as the oxidizing agent, generator 1 contains above grid 35 a fluidized mass consisting substantially of $Fe_2O_3$ introduced via line 9 at a point above the uppermost tray 43 and overflowing through overflow weirs 44 to the lower trays 43. The $Fe_2O_3$ has a particle size generally of 100 to 200 mesh. The temperature of the $Fe_2O_3$ in the generator is held at about 800 to 1000° C. Finely-divided coke is supplied through drop leg 3 at an hourly rate of about 0.01 to 0.05 lb. per lb. of $Fe_2O_3$ fed to the generator. The heat necessary to sustain the reaction: $C + 6Fe_2O_3 \rightarrow CO_2 + 4Fe_3O_4$ is supplied by the sensible heat of the $Fe_2O_3$ introduced to the generator as will be later explained or additional heat may be added if required or desired by conventional means such as by coils 33 contained within the fluidized beds on one or more of the various trays 43.

The generator unit is best started up by introduction into the bottom thereof of hot combustion gases for both fluidization and heat supply. When the temperature is brought up sufficiently so that active interaction of the coke and $Fe_2O_3$ sets in, recycle of top gases to the bottom of the generator for fluidization is started. This soon purges gases other than $CO_2$ from the unit. However, external $CO_2$ may, if desired, be introduced to expedite this purging and fluidization. In order that the carbon contained in the coke be substantially completely converted to $CO_2$ a countercurrent system is provided. For this purpose generator 1 contains trays 43 provided with overflow levels or down-comers 44 at intervals throughout the vessel. The number of trays may be varied according to the capacity of the vessel and the extent of the oxidation required. The fluidized materials entering the generator through lines 3 and 9 build up on the tray until the level of the overflow is reached, after which the fluidized materials pass downwardly in succession to the next lower level. The depth of the bed on each tray is preferably about 2 to 3 ft. The flow of fluidized materials occurs countercurrent to the upward flow of fluidizing gas entering the vessel through line 31. However, the flow rate of the gas is controlled so as not to interfere with the overall downward flow of the fluidized solids.

Substantially pure $CO_2$ amounting to about 0.2 to 0.9 mol per atom of carbon in the coke charged and containing suspended solids is withdrawn overhead from generator 1, passed through cyclone 10, and recovered through line 11 substantially free of entrained solids. The recovered gas is further worked up by condensation and/or absorption by conventional means not shown. Solids separated in cyclone 10 may be returned to the fluidized mass through pipe 12. Particles of undesirably small size or excess may be discarded through line 13.

Part of the $CO_2$ produced is removed from line 11 via line 14 and introduced into the bottom of generator 1, with the aid of blower 45 to maintain uniform fluidized conditions throughout the solids in the generator. Aerating lines 15 and 16 equipped with valves are provided to introduce aerating gas, such as $CO_2$ into line 9, diluting the solid phase flowing therethrough, thus facilitating its flow into vessel 1.

When the oxidation of the coke to $CO_2$ in vessel 1 has proceeded to the proper point, the spent solids contained in vessel 1 are removed and passed under the pseudo-hydrostatic pressure of the fluidized mass through withdrawal well and standpipe 17 with the assistance of dilution air entering through line 18 and carried into an upper portion of regenerator 7 via line 19. Additional aerating gas may be supplied through lines 32 and 34. Standpipe 17 may be enlarged in area so as to serve as a soaker in order to more completely remove carbon from the withdrawn solids. The solid materials thus removed contain reacted iron oxide in the form of $Fe_3O_4$, some unconverted $Fe_2O_3$ and carbon, and ash. To maintain satisfactory oxidation rates in generator 1, the $Fe_2O_3$ content of the mixture is not allowed to fall below 10% by weight, preferably not below 20 to 50% by weight of the total iron oxides. The amount of carbon carried out through line 17 into regenerator 7 depends upon the reactivity of the carbon toward the metallic oxide, which depends largely upon the character of the carbonaceous material. However, the amount of carbon leaving generator 1 can be low, for example, about 0.1 to about 1 weight percent of the fluidized oxide recycled to the regenerator. The more carbon put into generator 1, other operating conditions unchanged, the more $CO_2$ is produced; however, the more carbon must be burned in regenerator 7. Where the demand for pure $CO_2$ is equivalent to only a limited fraction of the carbon in the fuel which must be burnt to get heat required for other processes, as in a boiler plant, running high carbon content in generator 1 can be very advantageous. Thus, even using a highly inert retort coke of low reactivity, by carrying about 3% of carbon in the oxide leaving generator 1, one can produce over a third of a ton of pure $CO_2$ per day per square foot of cross section in that unit with a net bed depth in it of 40 ft., at atmospheric pressure and an operating temperature of 1000° C. Even with no counterflow in vessel 1, about 25% of the carbon in the fuel is obtained in the form of pure $CO_2$ from generator 1, the rest being used for heat production in 7. The heat is recovered in coil 26, which functions best as the water tubes of a boiler. With more reactive carbons one can operate generator 1 at lower temperatures, secure larger productions of $CO_2$ from it, reduce its height, recover far higher fractions of the total carbon of the fuel as pure $CO_2$ from vessel 1, or combine these advantages as seems most desirable under any specific set of circumstances.

High ash content carbonaceous material causes rapid build up of ash in the iron oxide to be recycled and this ash build up is not desirable. Air of substantially atmospheric pressure to fluidize and oxidize the solids and which may be preheated to a temperature as high as about 1000° to 1200° C. by heat exchange with the hot gases emerging from regenerator 7 via line 20, is introduced into regenerator 7 via lines 18 and 21, entering at the lower portion of regenerator 7 through a perforated distribution plate of grid 22. In regenerator 7 any carbon carried over from generator 1 is burned with excess air and the $Fe_3O_4$ becomes reoxidized to $Fe_2O_3$. A temperature of 1000° to 1200° C., preferably 1050° to 1100° C. is maintained in regenerator 7 and the reaction proceeds according to the equation:

$$4Fe_3O_4 + O_2 \rightarrow 6Fe_2O_3$$

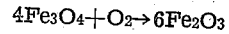

The superficial linear gas velocity within regenerator 7 is preferably maintained at about 0.5 to 3 ft. per second to establish an apparent bed density up to about 70 to 80 lbs. per cubic ft. and a bed height between grid 22 and level 23 of about 5 to 15 ft.

The reoxidized iron oxide is withdrawn under the pseudo-hydrostatic pressure of the fluidized mass via withdrawal well and standpipe 24, and returned to generator 1 via line 9 entering near the top thereof. Aerating lines 15, 16 and 25 equipped with valves are provided for introduction of fluidizing and purge gas, such as $CO_2$, to dilute and strip the solid phase of the fluidized mixture and to assist in its flow to vessel 1 where the cycle is repeated. Carbon dioxide introduced through lines 15 and 16 serves to purge the fluid of any remaining traces of nitrogen and air which may be contained therein, as it is desirable to keep all but traces of nitrogen from generator 1. Hot spent gases containing excess air, nitrogen, etc., are removed from regenerator 7 via line 20 and are withdrawn from the system after passing in heat exchange with the incoming air, as previously explained.

One of the problems in this process is to remove the heat of oxidation from regenerator 7 and to control the temperature required for the $CO_2$ formation in generator 1. Regenerator 7 is operated at a temperature higher than that required in generator 1, say about 100° C. or higher. The sensible heat of the solids flowing from regenerator 7 via line 9 to generator 1 is, therefore, of a higher temperature than that of the solids in generator 1, so that any net heat required in generator 1 may be supplied by circulating adequate amounts of solids from regenerator 7 to generator 1. A solids circulation of about 80 to even as high as 400 lbs. between the vessels per lb. of carbonaceous material charged is generally sufficient to satisfy the oxygen and heat requirements of the system. The amount of metal oxide transferred from regenerator 7 to generator 1 should be as small as possible and should not exceed that required for the desired heat supply to generator 1. However, it is within the scope of this invention to add to the metal oxide entering generator 1 a small amount of other solid materials such as alkaline carbonates and oxides which may catalyze the reaction in generator 1. Even inert heat carriers may be added. Of course, heat may be supplied to generator 1 through coil 33 or by other conventional means, if required. The temperature in regenerator 7 may be readily kept within the desired range by conventional cooling means, e. g., by cooling coils 26 which may be inserted in the vessel or preferably by withdrawing a portion of the hot solids via line 38, passing the hot solids with the assistance of dilution air from pipe 41 through an external cooler 39 operating as a waste heat boiler and returning the cooled solids to the vessel 7 via line 40. It is also within the scope of this invention that the oxygen content of the solids circulated to the reaction zone may be so controlled that any desired proportion of these solids may act as inert heat carriers.

Withdrawal wells and standpipes 17 and 24 in vessels 1 and 7 respectively are located as far as possible from the end of the standpipes supplying the charges to the respective vessels. Vessels 1 and 7 are provided with cyclone separators 10 and 27 for removal of finely-divided material from the outgoing gases, such as iron oxide or carbon fines, which are too small in size to remain fluidized. The cyclone separators are equipped with dip legs 12 and 28 respectively for return of solids to the dense bed. Materials which are too small in size to remain fluidized are withdrawn via lines 13 and 29 respectively. This material will also contain some ash produced in the system. Any fly ash not retained by the separators can be removed from the gas streams leaving the vessels through lines 11 and 20 respectively by suitable means, such as scrubbing, if desired. From some fuels fly ash forming in vessel 7 tends to collect and float at a point near the top of the fluidized mass indicated by the level 23. Periodically a portion of this material is removed via line 30 and discarded in order to prevent build-up.

The fluidized solids in vessel 1 are maintained at an apparent density of 70 to 80 lbs. per cubic ft. The suspension in regenerator 7 may be of greater apparent density, averaging about 100 to 120 lbs. per cubic ft. The material flowing through lines 9 and 19 into vessels 1 and 7 respectively are maintained at a lower apparent density of approximately 50 to 60 lbs. per cubic ft.

Once the process is in operation the only additional iron oxide required is make-up material required to supplant that which becomes too fine to fluidize or which is lost by dilution with ash.

Any manner of obtaining effective countercurrent flow between the fluidized oxide and carbon in the generator is desirable. For example, the system previously described may be employed or a moving bed type reactor may be used. Temperatures in the generator should be uniformly maintained between 800° and 1000° C. If lower temperatures are employed the reaction rate is too low resulting in low capacity. If higher temperatures are employed difficulties such as sintering or fusion are likely to be encountered.

The system described may be operated at atmospheric or superatmospheric pressure. It is preferred to operate the generator under superatmospheric pressure and the regenerator under atmospheric pressure.

The apparatus described in Figure 1 is also ideally suited for the conversion of gaseous and gasifiable hydrocarbons to $CO_2$. Such hydrocarbons, e. g., methane, may be introduced in vessel 1 via line 36 controlled by valve 37. The hydrocarbon gas passes upwardly through grid 35 and contacts the iron oxide. In this case counterflow of solids and gas in vessel 1 is unnecessary and bed depth in generator 1 can be as low as a few feet. However, it is very desirable to maintain a considerable excess flow of $Fe_2O_3$ through vessel 1 relative to the $CH_4$ fed to assure the presence of $Fe_2O_3$ throughout the bed and in the solids effluent from it. At the temperature of the iron oxide the hydrocarbon reacts with the iron oxide to produce $CO_2$ and $H_2O$ which emerge from vessel 1 via line 11. The water is removed from the $CO_2$ by conventional means not shown. The hydrocarbon vapor entering the system via line 36 may be pre-heated to a temperature short of cracking before introduction into vessel 1.

Solids circulation between vessels 1 and 7 may also be accomplished by arranging the vessels at different levels and using standpipes and dilute solids in gas suspensions to accomplish downward and upward flow respectively in a manner known in the art of fluid solids handling.

It will be understood that the gases used for fluidizing the various solids transfer lines and for purging purposes, should be selected so as not to interfere with the reactions intended, for example, air may be employed as a fluidizing means supplied in lines 18, 32 and 34. However, carbon dioxide or other suitable gas is used in lines 15, 16 and 25. Air or nitrogen is not to be used as the fluidizing gas at the latter points since it is not desirable to contaminate the $CO_2$ product with nitrogen.

While a two or more vessel system of the type illustrated is essential for a continuous production of $CO_2$, it is noted that intermittent operation carried out in a single vessel in a "make and blow" manner is likewise within the scope of the present invention. In this case the "make" period will be operated substantially at the conditions outlined above for generator 1 and the "blow" period at those conditions outlined for regenerator 7 as will be readily understood by those skilled in the art.

Figure 2 represents a diagrammatic sketch of apparatus employed in carrying out the process with the soaker-type or moving bed reactor. Referring to Figure 2, numeral 1 represents a reaction vessel to the upper end of which are added carbonaceous solids via line 2 and hot metallic oxide, e. g., $Fe_2O_3$, via line 3. It is also possible to mix the two solids before introduction into vessel 1. The solids are allowed to fill the vessel and thereafter flow through the vessel at a predetermined rate controlled by the operation of valve 9. The solids undergo reaction during passage downwardly in the vessel 1 according to the equation $C + 6Fe_2O_3 \rightarrow CO_2 + 4Fe_3O_4$. The $CO_2$ generated passes up through the solids and is removed via line 4. In vessel 1 the solids settle at a predetermined rate without turbulence or with only a minimum amount of turbulence. To assure complete conversion of carbon provision is made for the introduction of small amounts of $CO_2$ gas into the bottom of the reaction vessel from line 4 via line 7 and pump 8. The reduced metallic oxide is removed from vessel 1 via line 5 at a predetermined rate and is conveyed to a regenerator not shown by the assistance of aerating gas such as air introduced via line 6. The regeneration operation and return of re-oxidized solids to line 3 is the same as that described in connection with Figure 1.

Figure 3 represents the alternate bed type of reactor. In Figure 3 alternate beds of metallic oxide contained in oxide chambers 1 are superimposed upon beds of carbonaceous solids such as charcoal contained in carbon chambers 2, etc. In initiating the process each of the oxide chambers 1 is filled with hot oxide entering the uppermost chamber via line 5 and passing via line 7 to the next lowermost chamber, etc. Similarly the solid carbonaceous material enters uppermost carbon chamber 2 via line 6 and proceeds to flow downwardly via line 8 until each of the carbon chambers contain the desired level of carbonaceous material. When the process has been initiated metallic oxide and carbonaceous solid are fed to the respective chambers at a uniform rate determined by the rate of withdrawal of the solids from the lowermost carbon and oxide chambers respectively. In starting up the process $CO_2$ is produced in the lowermost oxide chamber, e. g., by passing a mixture of CO and $CO_2$ via line 3 into the lowermost metallic oxide chamber 1. Or charcoal may be reacted with an excess of metallic oxide in the lowermost oxide chamber. The gases pass upwardly through the oxide bed during which passage the CO is converted substantially to $CO_2$. The $CO_2$ stream is taken off the oxide chamber via line 4 and is introduced into the bottom of the lowermost carbon chamber 2. The $CO_2$ passes upwardly through the bed of carbonaceous material and is reduced to a mixture of CO and $CO_2$ by the reaction: $CO_2 + C \rightarrow 2CO$. This mixture of CO and $CO_2$ is withdrawn via line 12 and is introduced into the bottom of the next lowermost metallic oxide chamber whereby the cycle is repeated. As many pairs of alternate beds may be employed as desired. The final $CO_2$ product is withdrawn via line 4 overhead from the uppermost metallic oxide bed thus assuring the absence of CO in the final product. Spent metallic oxide is withdrawn from lowermost oxide chamber via line 9 and sent to a regenerator as described in connection with Figure 1. The hot regenerated metallic oxide is re-introduced into the reaction system via line 5. A continuous supply of carbonaceous material is furnished to the system via line 6. Any unreacted carbon from the lowermost carbon chamber is withdrawn via line 15 and returned via line 10 to supply line 6. Ash build-up is prevented by periodic withdrawal of part of the carbon via line 13. In the system described in Figure 3 mixing of the metallic oxide and solid carbon is entirely prevented.

The initial gaseous mixture of CO and $CO_2$ fed to the reaction system is obtained by oxidizing carbonaceous material with metallic oxide. Once the reaction is under way part of the CO and $CO_2$ mixture leaving one of the carbon chambers may be bled off and introduced into the lowermost metallic oxide chamber, e. g., via line 14.

When CuO on a suitable carrier is employed in place of $Fe_2O_3$ as the source of oxygen in the processes of Figures 1 and 2 heat is available in both the $CO_2$ generator and in the regenerator due to the exothermic character of both reactions. In this event it is preferred to remove heat from only one of the vessels, e. g., by withdrawing a stream of hot solids from the regenerator, cooling the withdrawn stream in an external cooler and returning the cooled stream to the regenerator. This cooling feature is illustrated in Figure 1.

This invention will be further illustrated by the following specific example.

An operation that will give a high yield (90%) on the carbon employed is secured by using as raw material a wood charcoal dust. For the production of about 100 tons per day of $CO_2$ using $Fe_2O_3$ having an average particle size of 100 to 400 mesh as the oxidizing agent in a system of the type illustrated by the drawing, the following approximate conditions have been found suitable:

| | |
|---|---|
| Generator temperature | 1000–1050° C. |
| Average generator pressure | 4 lbs./sq. in. gauge. |
| Regeneration temperature | 1050–1100° C. |
| Charcoal feed rate, lbs. per hr. | 2750 lbs. |
| Air feed rate to regenerator | 9000 cu. ft./min. |
| Solids circulation rate | 7000 lbs./min. |
| Superficial gas velocity in generator | 0.9 ft./sec. |
| Superficial gas velocity in regenerator | 1.0 ft./sec. |
| Density of suspension in generator | 100 lbs./cu. ft. |
| Density of suspension in regenerator | 80 lbs./cu. ft. |
| Generator bed depth | 35 ft. |

The carbon dioxide produced under these conditions has a composition about as follows:

| | Percent |
|---|---|
| $CO_2$ | 98 |
| CO | <1 |
| Nitrogen | <2 |

While the foregoing description and exemplary operations have served to illustrate specific applications and results of the invention, other modifications obvious to those skilled in the art are within the scope of the invention. Only such limitations should be imposed on the invention as are indicated in the appended claims.

What is claimed is:

1. A process for preparing pure $CO_2$ substantially free of non-condensible gases which comprises contacting carbonaceous material in a reaction zone with solid finely-divided higher metal oxide selected from the group consisting of ferric oxide, vanadium pentoxide and stannic oxide, maintaining the solids content in the reaction zone in a fluidized state by means of injected $CO_2$ gas and at a temperature of 500° C. to 1200° C. whereby the carbonaceous material is oxidized to $CO_2$ and the metal oxide reduced to a lower oxide, removing substantially pure $CO_2$ from an upper part of the reaction zone, removing from the reaction zone a stream of solid higher and lower metal oxides containing at least 10 weight per cent of the higher oxide, introducing the withdrawn stream into a separate oxidation zone wherein the lower oxide is reoxidized to the higher oxide by means of a free oxygen-containing gas and the exothermic heat of reaction imparted to the oxide, withdrawing a stream of hot reoxidized higher metal oxide from the oxidation zone, purging the hot higher metal oxide of non-condensible gases by means of $CO_2$ gas injected into the withdrawn stream, separating the purged non-condensible gases from the hot oxide, and returning hot purged higher metal oxide fluidized in $CO_2$ to the reaction zone.

2. A process for producing pure $CO_2$ substantially free of non-condensible gases which comprises contacting carbonaceous material in a reaction zone with finely-divided solid $Fe_2O_3$, maintaining the solids content in the reaction zone in a fluidized state by means of injected $CO_2$ gas and at a temperature of 800° C. to 1000° C. whereby the carbonaceous material is oxidized to $CO_2$ and $Fe_2O_3$ reduced to $Fe_3O_4$, removing substantially pure $CO_2$ from an upper part of the reaction zone, removing from the reaction zone a stream of solid $Fe_2O_3$ and $Fe_3O_4$ containing at least 10 weight per cent of $Fe_2O_3$, introducing the withdrawn stream into a separate oxidation zone wherein the $Fe_3O_4$ is reoxidized to $Fe_2O_3$ by means of air and the exothermic heat of reaction imparted to the $Fe_2O_3$, withdrawing a stream of hot $Fe_2O_3$ from the oxidation zone, purging the hot $Fe_2O_3$ of air and gaseous combustion products by means of $CO_2$ gas injected into the withdrawn stream separating the purged gases from the hot $Fe_2O_3$ and returning the hot $Fe_2O_3$ fluidized in $CO_2$ to the reduction zone.

3. A process according to claim 2 in which the carbonaceous material is natural gas.

4. A process according to claim 2 in which the carbonaceous material is methane.

5. A process according to claim 2 in which the carbonaceous material is finely-divided coke.

6. A process according to claim 2 wherein the $Fe_2O_3$ content of the oxides in the reaction zone is maintained between 25 and 50 weight per cent.

WARREN K. LEWIS.
EDWIN R. GILLILAND.

References Cited in the file of this patent

UNITED STATES PATENTS

| Number | Name | Date |
|---|---|---|
| 68,321 | Stevens | Aug. 27, 1867 |
| 1,332,138 | Newhouse | Feb. 24, 1920 |
| 2,296,522 | Hartley | Sept. 22, 1942 |
| 2,384,971 | Silvasy et al. | Sept. 18, 1945 |
| 2,555,374 | Rowe et al. | June 5, 1951 |

FOREIGN PATENTS

| Number | Country | Date |
|---|---|---|
| 936 | Great Britain | 1862 |
| 10,759 | Great Britain | 1887 |
| 6,835 | Great Britain | 1896 |
| 597,221 | Great Britain | Jan. 21, 1948 |

OTHER REFERENCES

"Improving Solids—Gas Contacting by Fluidization," by J. C. Kalbach, June 1944, Chem. and Met. Eng., pp. 94–97.

McPherson and Henderson's "General Chemistry," 3rd ed., pp. 590–593, Ginn and Co., N. Y.

"Thorpe's Dictionary of Applied Chemistry," vol. 7, 4th ed., pages 32, 33. Longmans, Green and Co., N. Y.